US010642684B1

(12) United States Patent
MacLaren et al.

(10) Patent No.: US 10,642,684 B1
(45) Date of Patent: May 5, 2020

(54) MEMORY COMMAND INTERLEAVING

(71) Applicant: Cadence Design Systems, Inc., San Jose, CA (US)

(72) Inventors: John M. MacLaren, Austin, TX (US); Anne Hughes, Austin, TX (US); Thomas J. Shepherd, Cedar Park, TX (US); Carl Nels Olson, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/022,276

(22) Filed: Jun. 28, 2018

(51) Int. Cl.
*G06F 11/10* (2006.01)
*G06F 3/06* (2006.01)

(52) U.S. Cl.
CPC ........ *G06F 11/1056* (2013.01); *G06F 3/0619* (2013.01); *G06F 3/0659* (2013.01)

(58) Field of Classification Search
CPC .................................................. G06F 11/1076
USPC ................. 714/764, 766, 767, 770
See application file for complete search history.

(56) References Cited

U.S. PATENT DOCUMENTS

| 4,312,036 | A | | 1/1982 | Porter et al. |
| 5,398,253 | A | * | 3/1995 | Gordon ............... G06F 11/1076 711/114 |
| 10,474,527 | B1 | | 11/2019 | Sun |
| 2008/0195894 | A1 | | 8/2008 | Schreck et al. |
| 2014/0068319 | A1 | * | 3/2014 | Daly .................... G11C 7/1006 714/6.2 |
| 2014/0108889 | A1 | | 4/2014 | Shaeffer |
| 2014/0177362 | A1 | | 6/2014 | O'connor et al. |
| 2014/0337677 | A1 | * | 11/2014 | Basso ..................... G06F 9/544 714/724 |
| 2019/0050316 | A1 | | 2/2019 | Kim et al. |

OTHER PUBLICATIONS

"U.S. Appl. No. 16/005,427, Non Final Office Action dated Jan. 15, 2020", 15 pgs.

* cited by examiner

*Primary Examiner* — Fritz Alphonse
(74) *Attorney, Agent, or Firm* — Schwegman Lundberg & Woessner, P.A.

(57) ABSTRACT

Various embodiments described herein provide for grouping read-modify-writes (RMWs) such that multiple RMW command sequences can be executed (or rearranged in the command queue) in an interleaved manner rather than being executed in order. In particular, various embodiments described herein split the read and write components (commands) of multiple RMW command sequences, group the read components in the command queue to execute consecutively, and group the write components in the command queue to execute consecutively.

20 Claims, 6 Drawing Sheets

MEMORY COMMAND INTERLEAVING

TECHNICAL FIELD

Embodiments described herein relate to memory and, more particularly, to systems, methods, devices, and instructions for interleaving memory commands of memory transactions, such as a read-modify-write transaction.

BACKGROUND

Memory controllers are generally circuits dedicated to controlling and managing the flow of data written to and read from one or more memory devices. They may be suitably formed as separate devices or integrated with a central processing unit or other main controller, and serve the memory storage and access needs of various software application operations. Memory controllers implement the logic to read from and write to various types of memory devices, examples of which include dynamic random access memory (DRAM), as well as electrically programmable types of non-volatile memory such as flash memory, and the like.

To minimize the consequences of data corruption due to random sources of error, various error checking measures for detection and/or correction are employed in the art for the storage and retrieval of data from memory devices. One example of the various known measures is the use of an Error Correcting Code (ECC) feature for detection or correction of error in data words read from one or more memory devices. An ECC feature is usually used in memory controllers for computing devices that are particularly vulnerable to data corruption, or for computing devices involved in high data rate or other applications where substantial immunity to data corruption is particularly important. ECC features generally involve adding redundant ECC bits to a transmitted data segment (e.g., transmitted to a memory device) according to a predetermined code (of a selected ECC format). These ECC bits are of parity-type and permit the data segment to be properly recovered at the receiving end (by a receiving/recovery method suitably configured for the given ECC format), even if certain correctable errors were introduced in the transmission or storage of that data segment. The degree to which the errors are correctable would depend on the relevant properties of the particular code being used.

Memory controllers generally transmit, receive, and store data words, and a data word format may be defined by a multiple number of bytes. The multiple data bytes of each data word may be stored in a memory device formed by a plurality of integrated circuit chips, and each data byte may be stored in a different selectable chip of the memory device at the same relative address within each selectable chip.

Some memory controllers are configured for storage of such ECC-protected data according to a sideband ECC storage scheme (or format). A sideband scheme for storing ECC and data bits usually provides for an additional chip (e.g., an ECC chip) in which the ECC byte associated with a given data word's data bytes is exclusively stored. The data word's ECC byte is then stored much like its data bytes—at the same intra-chip address as those data bytes, but in its dedicated sideband ECC chip. For example, in some ECC-protected memory controller applications, a data word may be defined by 72 total bits, segmented into eight 8-bit data bytes and one 8-bit ECC byte (one ECC bit for each of the eight 8-bit data bytes). For such an example (a 72-bit data word formed by 8 data bytes plus 1 ECC byte), the data word is stored across nine selectable chips—eight selectable chips for the data bytes and one selectable chip for the associated ECC byte. Under the sideband ECC storage scheme, memory transactions for reading and writing data to and from memory devices contemplate and support sideband storage of ECC bytes with their associated data bytes (e.g., data words).

Other memory controllers may use a non-sideband ECC memory storage scheme, such as an ECC storage scheme (or format) where ECC-protected bytes are stored inline (along) with their ECC bytes in one or more of chips available on a given memory device. For example, under an inline ECC storage scheme, a portion of the memory storage locations available on a chip of a memory device may be allocated for primary data bytes and the remainder allocated for ECC bytes so that the ECC bytes are stored inline with the primary data bytes. Additionally, a memory controller implementing an inline ECC storage scheme may adapt a memory transaction for inline storage configurations, where different portions of given data words are stored at different intra-chip addresses. In this way, available memory device chips may be shared for data and ECC bit storage according to a wide range of memory space configurations depending on such factors as data word size, the number and layout of available storage cells, and the like. An inline ECC storage scheme may be utilized when ECC protection for memory transactions exists but a memory device is not adequately equipped or configured to support sideband storage of ECC bytes. For example, an inline ECC storage scheme (or feature) can provide ECC protection similar to a sideband ECC memory storage scheme without the sideband ECC memory storage scheme's need to widen the memory data path between a memory controller and a memory device to communicate ECC on dedicated pins alongside memory data (e.g., a 9-byte wide memory interface where 8 bytes of the memory are data and 1 byte is the ECC for the 8 bytes of data).

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
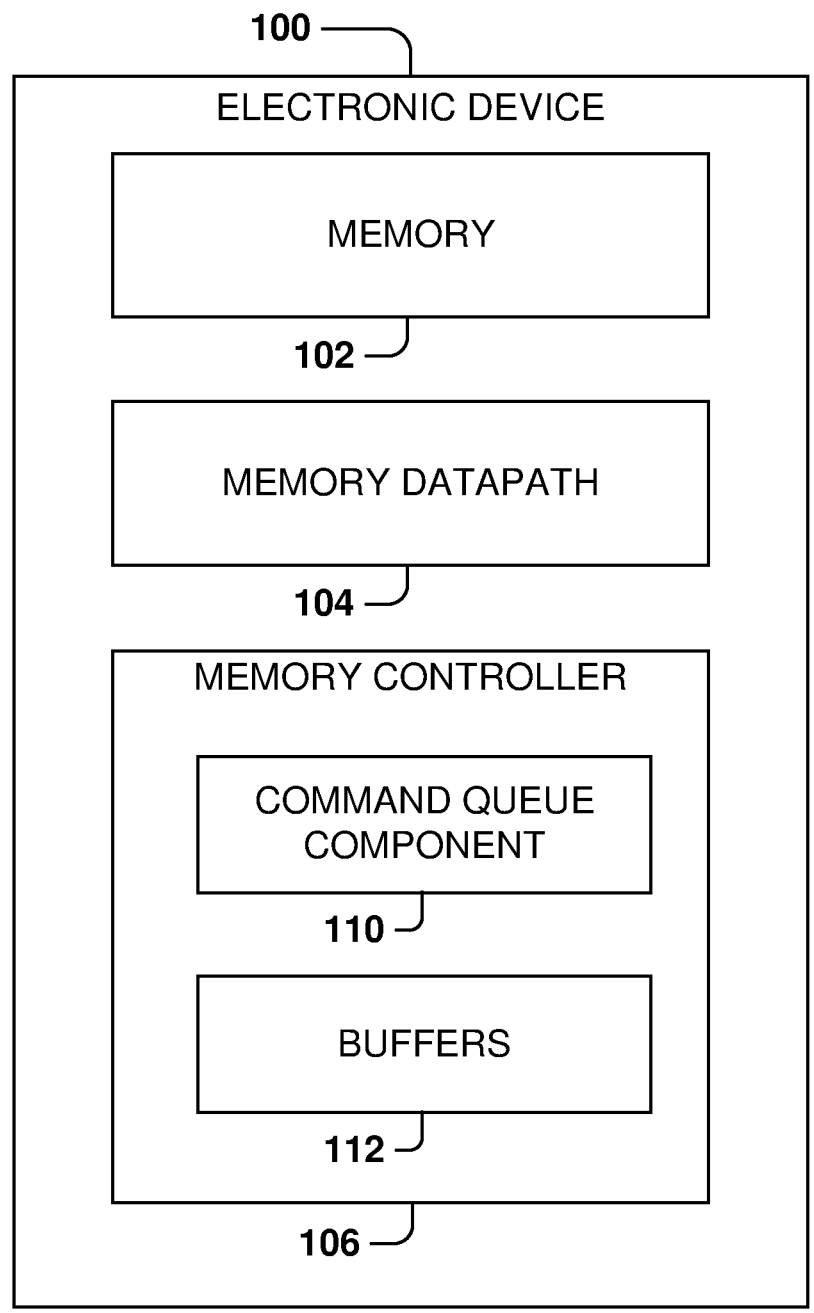
FIG. 1 is a block diagram illustrating an example electronic device that includes a memory controller, in accordance with various embodiments.

Relative to a memory burst transaction, misaligned and undersized writes are typically converted by a memory controller to cause a read-modify-write command sequence (hereinafter, RMW), which can be a significant hindrance to performance of a memory system. Generally, a RMW requires a memory read from a memory, the read data is stored, the write data is merged, and then the new merged write data is written back to the memory. RMW can be further complicated when coupled with error checking data (e.g., ECC data) since error checking data would be calculated on the merged data. Based on the performance factor of turnaround between read operations to write operations, tWTR (write to read turn-around) for conventional random access memory (e.g., DRAM) can be very large for RMWs (e.g., on the order of 15 ns), and in future memories, the tWTR delay is projected to increase (e.g., by 3 times, also referred to as 3×tWTR).

Furthermore, compared to memory that use a sideband storage scheme for error checking data (e.g., ECC data), memory operations for memory that store primary data inline with error checking data may generate more RMW traffic, particularly due to the additional memory operations used for the inline-stored error checking data. For example, for a memory that uses an inline storage scheme for error checking data, a write command may necessitate either an RMW for error checking data (e.g., RMW ECC transaction) or a masked write command since the associated ECC may not be an entire memory burst, while a RMW for primary data will also result in an RMW for error checking data.

Various embodiments described herein can reduce or avoid the turnaround delay (e.g., tWTR) between read operations to write operations for multiple RMWs, and can increase memory bus utilization over traditional memory systems.

According to some embodiments, RMWs are grouped such that multiple RMWs can be executed (or rearranged in the command queue) in an interleaved manner (e.g., RRRWWW) rather than being executed in order (e.g., order in which they are generated and placed in a command queue—RWRWRW). In particular, various embodiments described herein split the read and write components (commands) of multiple RMWs, group the read components in the command queue to execute consecutively, and group the write components in the command queue to execute consecutively. Doing so can allow several RMWs to be executed as groups of read commands followed by groups of write commands, which can minimize the bus turnaround occurrences and effectively reduce the inefficiency associated with tWR. This is unlike traditional memory systems and controllers, which cause RMW transactions to be run in order and do not permit interleaving of RMW transactions.

Since the read and write of a given RMW operates on the same data, various embodiments store (and thus utilize storage for) multiple commands worth of data. According to some embodiments, a read-modify-write (RMW) buffer from a plurality of RMW buffers (e.g., 8 to 16 RMW buffers) is allocated for each RMW write command in the group of write commands (or alternatively for each RMW read command in the group of read commands) in the command queue.

Additionally, for a memory that uses an inline storage scheme for error checking data (e.g., ECC data), an embodiment may store (and thus utilize storage for) multiple commands worth of error checking data (e.g., ECC data). According to some embodiments, an error checking data buffer from a plurality of error checking data buffers (e.g., 8 to 16 error checking data buffers) is allocated for each error checking data (e.g., ECC) write command in the group of write commands (or alternatively for each error checking data (e.g., ECC) read command in the group of read commands) in the command queue.

Furthermore, various embodiments described herein use a watermarking technique or mechanism to track the number of RMWs that are currently in a command queue, which can permit an embodiment to maximize the interleaving while also adhering to a limitation of the storage available to a particular memory system (e.g., limited availability of RMW buffers, error checking data buffers, or both). For instance, some embodiments allow N RMWs to be interleaved, where N is the number of RMW buffers available for use. The N number of RMW buffers may be configured by a user and may be adjusted to optimize the trade-off between storage area and performance. For some embodiments, if N is exceeded, a watermark (also referred to as a RMW watermark) is used to start a new group of interleaved transactions, thereby ensuring that the RMW buffers are not overflowed and continue to perform optimally.

For a memory that uses an inline storage scheme for error checking data (e.g., ECC data), some embodiments include management of RMW buffers and error checking data buffers to prevent over-allocation of resources for read-modify-write interleaving (e.g., the maximum number of interleaved RMWs exceeding the number of RMW buffers available). For some embodiments, RMW buffers are dedicated for storing primary data and error checking data buffers are dedicated for storing error checking data for the primary data.

For some embodiments, to support read-modify-write interleaving (e.g., for both primary data and error checking data commands), a memory controller limits the number of concurrent RMWs within interleaved groups to prevent over-allocation of the limited resources (e.g., buffers). Some embodiments count the number of RMW-write commands (or RMW-read commands) in the current RMW group and set a watermark (e.g., watermark bit) when a limit is reached. For some embodiments, the number of RMWs for primary data that can be in progress at a given time is limited by the number of RMW buffers. Additionally, where a memory uses an inline configuration for storing error checking data with primary data, the number of RMWs for error checking data that can be in progress at a given time can be limited by the number of error checking data (e.g., ECC) buffers. For a memory that uses an inline configuration for storing error checking data with primary data, each primary data RMW may result in an error checking data RMW.

For RMW interleaving, primary data fetched by a RMW-read command may be stored in one of the RMW buffers until the associated RMW-write command is executed. Once stored to a RMW buffer, write data for the RMW may be merged with the primary data stored in the RMW buffer, and the RMW-write command may be executed. The number of error checking data (e.g., ECC) RMWs may be limited programmatically to limit the number of error checking data buffers that can be allocated to RMWs.

According to some embodiments, a counter is used to track (e.g., sum) the total number of RMWs (e.g., specifically, RMW-write commands) to determine if a maximum number of interleaved RMWs supported (e.g., by the number of RMW buffers) has been reached or exceeded. For a memory that stores error checking data inline with primary data, the counter may count error checking data (e.g., ECC) RMW-write commands, which may be beneficial for embodiments where an error checking data RMW-write command may exist without a primary data RMW-write command but not the other way around. For a memory that uses non-inline configuration for storing error checking data (e.g., sideband configuration), the counter may count primary data RMW-write commands.

For some embodiments, if a maximum number of interleaved RMWs has been reached or exceeded, a RMW watermark (e.g., watermark bit) is set for entries currently in a command queue for RMW commands (e.g., for all RMW-write command entries currently in the command queue). For various embodiments, a watermark is set for all entries in a command queue since the RMW commands may be executed out-of-order.

According to some embodiments, a watermark is set (e.g., watermark bit is set with respect to an entry in a command queue) when a new RMW command sequence is being placed. In this way, the maximum condition can be resolved prior to a next RMW command sequence being placed rather than immediately setting the watermark when the next RMW command sequence may not follow immediately. Additionally, for some embodiments, the count is when an RMW-read command of a given RMW is being placed, given that the RMW-read command precedes a RMW-write command of the given RMW.

According to some embodiments, a watermark bit is included by each entry in a command queue for use by RMW interleaving operations as described herein. A watermark bit may be set for a given entry in the command queue having an RMW-command (e.g., RMW-write command for primary data or error checking data) when an embodiment detects that a maximum number of interleaved RMW (e.g., RMW-write commands) has been reached or exceeded. The watermark bit of the given entry in the command queue may be cleared when the associated command (e.g., RMW write command for primary data or error checking data) is popped for execution.

Though various embodiments are described herein with respect to memory that store primary data inline with error checking data (e.g., ECC data), other embodiments enable interleaving of RMWs for memory that use a non-inline configuration for error checking data (e.g., memory that use sideband storage of error checking data).

As used herein, for a given RMW command sequence, a RMW-read command refers to a read command of the given RMW command sequence and a RMW-write command refers to a write command of the given RMW command sequence. A primary data RMW may refer to a RMW command sequence that operates on primary data stored on a memory, while an error checking data (e.g., ECC) RMW may refer to a RMW command sequence that operates on error checking data stored on a memory (e.g., error checking data stored inline with primary data as described herein). Accordingly, a primary data RMW-read command refers to a read command in a RMW command sequence for primary data, a primary data RMW-write command refers to a write command in a RMW command sequence for primary data, an error checking data (e.g., ECC) RMW-read command refers to a read command in a RMW command sequence for error checking data (e.g., ECC), and an error checking data (e.g., ECC) RMW-write command refers to a write command in a RMW command sequence for error checking data (e.g., ECC).

As used herein, primary data may refer to data that is stored or will be stored on a memory and that is intended to be checked or protected by error checking data. Error checking data for primary data can include ECC data.

As used herein, inline primary data addresses refer to memory addresses of a memory that correspond to those segments of the memory that store primary data on the memory. Inline error checking data addresses refer to memory addresses of a memory that correspond to those segments of the memory that store error checking data on the memory.

As used herein, an error checking data address range (e.g., ECC address range) may include all inline error checking data addresses associated with (e.g., that map to) a primary data memory transaction with respect to a range of inline primary data addresses on a memory. For example, an ECC address range with respect to a memory may include all inline error checking data addresses that correspond to error checking data, on the memory, associated with a plurality of primary data memory burst transactions. For instance, with a primary data-to-ECC ratio of 8 to 1, an ECC address range may be associated with a single memory burst worth of ECC data on a memory that covers 8 memory bursts worth of primary data on the memory.

As used herein, an error checking data address range boundary determines when one error checking data address range ends and another error checking data address range begins.

As used herein, an error checking data buffer (e.g., ECC data buffer) may comprise a single storage element that will store a single memory burst reading of error checking data (e.g., ECC data) stored on a memory. For example, the data size of an electronic checking data buffer would be 32 bytes where a single memory burst reading of error checking data results in 32 bytes of electronic checking data being read from the memory. Some embodiments use a plurality of error checking data buffers, where each error checking data buffer may be managed independently.

As used herein, a memory burst command/operation (or burst mode memory command/operation) may refer to a command/operation that results in repetitious transmission of data a predetermined number of times to result in a memory data path width (DP) times burst length (BL) worth of data, without need to transmit each piece of data in a separate transaction (e.g., a single memory burst read command for a typical central processing unit (CPU) fetches a cache line worth of data). For example, where a memory burst command/operation has a burst length of 16 (BL=16) and a 16-bit data path width (DP=16), a single burst command will result in transmission of 256-bits (32 bytes) of data by a single memory transaction, rather than multiple separate memory transactions (e.g., 16 separate 16-bit memory transactions). Accordingly, a memory burst read command/operation performed with respect to a memory can result in the reading (e.g., fetching) of a predetermined number of data words stored on the memory, and a memory burst write command/operation performed with respect to a memory can result in the writing of a predetermined number of data words to the memory. A data word can include a predetermined number of bytes (e.g., 8 bytes for a 64-bit data word).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example electronic device 100 that includes a memory controller 106 with error checking data caching, in accordance with various embodiments. The electronic device 100 may comprise any electronic device that uses a memory and a processor, such as a CPU or a graphics processing unit (GPU). For instance, the electronic device 100 may comprise, without limitation, a computer (e.g., a server computer, a client computer, a personal computer (PC), a tablet computer, a laptop computer, a netbook), a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any electronic device capable of executing instructions with respect to a memory.

As shown, the electronic device 100 includes a memory 102, a memory datapath 104, and the memory controller 106, which performs error checking data caching operations, in accordance with various embodiments. Any one or more of the components described may be implemented using hardware (e.g., one or more circuits) alone or a combination of hardware and software. Moreover, any two or more components of the electronic device 100 may be combined into a single component, and the functions described herein for a single component may be subdivided among multiple components.

To avoid obscuring illustrated embodiments with unnecessary detail, various functional components that are not germane to conveying an understanding of the illustrated embodiments have been omitted from FIG. 1. Various additional functional components may be supported by the electronic device 100 to facilitate additional functionality that is not specifically described herein.

The memory 102 comprises one or more memory cells or memory devices, each of which may comprise some form of random access memory (RAM), such as Dynamic Random-Access Memory (DRAM) or Static Random-Access Memory (SRAM). The memory 102 may be packaged as a single in-line memory module (SIMM) or a dual in-line memory module (DIMM) that can be plugged into an electronic device including an appropriate socket. For some embodiments, the memory 102 comprises Double Data Rate (DDR) Synchronous Dynamic Random-Access Memory (SDRAM), such as Double Data Rate 3 (DDR3), Double Data Rate 4 (DDR4), Low Power Double Data Rate 3 (LPDDR3), or Low Power Double Data Rate 4 (LPDDR4).

The memory datapath 104 comprises one or more electronic signal paths coupling together the memory 102 and the memory controller 106 (e.g., individual lines between pins of the memory 102 and the memory controller 106) such that data, address, command, control, clock, and other information can be carried between the memory 102 and the memory controller 106. For example, the memory datapath 104 may comprise an interconnect, such as a link or a bus. Accordingly, the memory datapath 104 may carry one or more electronic signals between the memory 102 and the memory controller 106. Among the electronic signals carried, the memory datapath 104 may carry one or more data signals for data to be written to, or read from, the memory 102 (e.g., a memory device of the memory 102). Additionally, the memory datapath 104 may carry one or more control signals, which can facilitate writing data to, or reading data from, the memory 102 (e.g., a memory device of the memory 102).

The memory controller 106 manages exchange of data to and from the memory 102 via the memory datapath 104. To facilitate this, the memory controller 106 may exchange data, address, command, control, clock, and other information with the memory 102 over the memory datapath 104.

As shown, the memory controller 106 includes a command queue component 110 and buffers 112. The command queue component 110 may store a plurality of memory commands (generated by the memory controller 106) for timely execution by the memory controller 106. Each of the buffers 112 may comprise a register or SRAM. Each of the buffers 112 may have a buffer identifier (ID), and may be managed independently of each other.

According to some embodiments, the buffers 112 include a plurality of RMW buffers, which are used for RMW interleaving operations as described herein. In particular, for some embodiments, the RMW buffers of the buffers 112 are used to interleave RMW command sequences operating on primary data stored on the memory 102.

According to some embodiments, where primary data is stored in line with error checking data on the memory 102, the buffers 112 include a plurality of error checking data (e.g., ECC) buffers, which are used for interleaving RMW command sequences operating on error checking data stored on the memory 102. To implement inline storage of primary data with error checking data on the memory 102, the memory controller 106 may use split addressing to generate memory commands for memory transactions with respect to the memory 102, and thereby cause primary data to be stored inline with error checking data generated for the primary data on the memory 102. With the inline storage configuration, the primary data may be stored on the memory 102 at a range of inline data addresses, and the error checking data may be stored on the memory 102 at a range of inline error checking data addresses, where the range of inline primary data addresses does not overlap with (is disjointed with respect to) the range of inline error checking data addresses.

According to various embodiments, the memory controller 106 facilitates interleaving of RMWs by placing commands in the command queue maintained by the command queue component 110 and by managing RMW buffers of the buffers 112. For instance, when a new RMW command sequence (for primary data or error checking data) is ready for placement by the memory controller 106 on the command queue, the memory controller 106 can analyze the command queue for RMW command sequences. Based on the analysis of the command queue, the memory controller 106 may place, in the command queue, a read command of the new RMW command sequence as part of a read-modify-write (RMW) group of consecutive read commands, and place, in the command queue, a write command of the new RMW command sequence as part of a RMW group of consecutive write commands. With respect to placement, the RMW group consecutive read commands may be placed in the command queue to execute prior to the RMW group of consecutive write commands.

In particular, analyzing the command queue (maintained by the command queue component 110) for read-modify-write command sequences can comprise the memory controller 106 determining whether a predetermined maximum number of read-modify-writes has been reached or exceeded. Accordingly, the memory controller 106 may place the read command of the new RMW command sequence as part of the read-modify-write group of consecutive read commands and place the write command of the new RMW command sequence as part of the read-modify-write group of consecutive write commands, in response to determining that the predetermined maximum number of read-modify-writes has been reached or exceeded. Additionally, the memory controller 106 may allocate a RMW buffer, from the buffers 112, for the read command of the new RMW command sequence in response to determining that the predetermined maximum number of read-modify-writes has been reached or exceeded, which the read command may then utilize during its subsequent execution. According to some embodiments, the memory controller 106 may allocate a RMW buffer, from the buffers 112, for each read command in the read-modify-write group of consecutive read commands.

For some embodiments, where primary data is stored inline with error checking data on the memory 102, a primary data RMW command sequence is accompanied by an error checking data RMW command sequence. Accordingly, the memory controller 106 may allocate an error checking data buffer, from the buffers 112, for the error checking data RMW command sequence (e.g., a read command of error checking data RMW command sequence) in response to determining that the predetermined maximum number of read-modify-writes has been reached or exceeded.

In response to determining that the predetermined maximum number of read-modify-writes has been reached or exceeded, the memory controller 106 may set a watermark bit in the command queue maintained by the command queue component 110. In particular, the memory controller 106 may set a watermark bit with respect to an entry in the command queue associated with at least a last write command (e.g., all last write commands) in the read-modify-write group of consecutive write commands. For embodiments where primary data is stored inline with error checking data on the memory 102, and a primary data RMW command sequence is accompanied by an error checking data RMW command sequence, the watermark may be set with respect to both primary data RMW-write commands and error checking data RMW-write commands.

The memory controller 106 may determine whether the predetermined maximum number of read-modify-writes has been reached or exceeded based on a counter that the memory controller 106 maintains for tracking a number of write commands in the read-modify-write group of consecutive write commands. For embodiments where primary data is stored inline with error checking data on the memory 102, and a primary data RMW command sequence is accompanied by an error checking data RMW command sequence, the counter maintained by the memory controller 106 may track primary data RMW-write commands (rather than error checking data RMW-write commands) in the read-modify-write group of consecutive write commands.

In response to determining that the predetermined maximum number of read-modify-writes has been reached or exceeded, the memory controller 106 may place a subsequent RMW command sequence in the command queue maintained by the command queue component 110 such that the subsequent RMW command sequence executes after execution of the read-modify-write group of consecutive write commands. For some embodiments, the memory controller 106 does this by placing the subsequent RMW command sequence in the command queue behind a last entry in the command queue having a set watermark bit.

For new RMW command sequences that occur while the predetermined maximum number of read-modify-writes remains reached or exceeded, the new RMW command sequences may be split into their read and write components and grouped into a new RMW group of consecutive read commands and a new RMW group of consecutive write commands that are placed behind a last entry in the command queue having a set watermark bit. Accordingly, in response to determining that the predetermined maximum number of read-modify-writes has been reached or exceeded, the memory controller 106 may: place, in the command queue, a read command of a new RMW command sequence as part of a second group of consecutive read commands that is behind a last entry in the command queue having a set watermark bit; and place, in the command queue, a write command of the new RMW command sequence as part of a second group of consecutive write commands that is also behind the last entry in the command queue having the set watermark bit.

Figure 2:
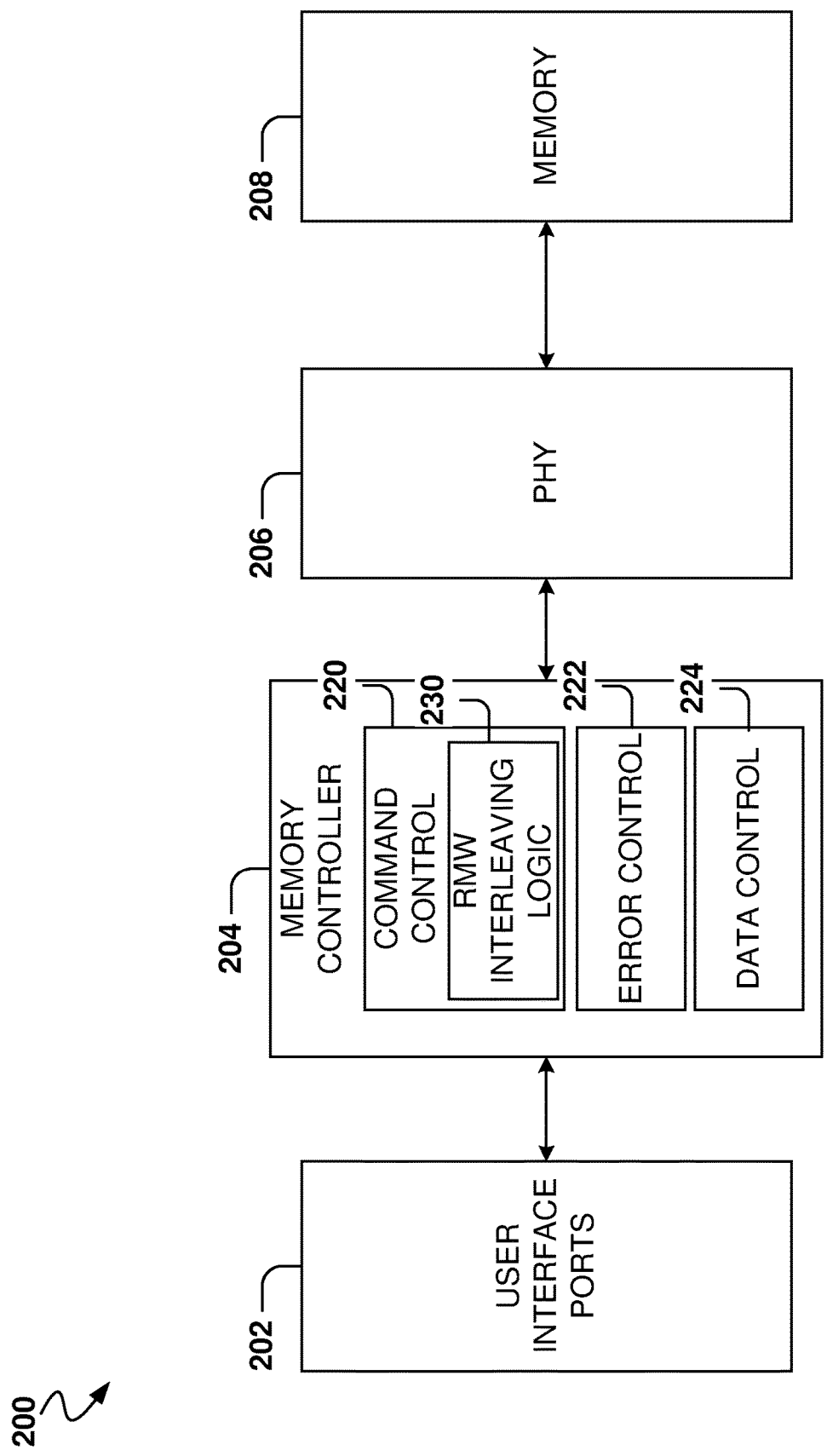
FIG. 2 is a schematic diagram illustrating an example memory system that includes an example memory controller with interleaving of read-modify-write (RMW) command sequences, in accordance with some embodiments.

FIG. 2 is a schematic diagram illustrating an example memory system 200 that includes an example memory controller 204 with interleaving of RMW command sequences, in accordance with some embodiments. As shown, the memory controller 204 can serve to provide control of a memory 208 (formed by one or more memory devices of any suitable type and configuration known in the art), which can support processing of a master control operation by a master controller (not shown). The memory controller 204 may communicate with a master controller through one or more user interface ports 202, and with the memory device(s) of the memory 208 through a physical interface (PHY) 206, which may be configured with a suitable interface standard known in the art for the memory 208.

The memory system 200 illustrated in FIG. 2 may be implemented in any known form, depending on the particular requirements of an intended application. For instance, the memory system 200 may be realized by discretely interconnected subsystems, or sufficiently integrated in the form of a system-on-chip (SOC) or the like, depending on the particular requirements of the intended application. As the user interface ports 202, the PHY 206, and the memory 208 may be of any suitable type and configuration known in the art, subject to the particular requirements of a given application, no further description is needed for description of features relating to the memory system 200.

In FIG. 2, the memory system 200 includes a command control portion 220, an error control portion 222, and a data control portion 224. In some embodiments, the data control portion 224 includes one or more digital circuits that implement functional logic to carry out a plurality of primary data access operations/commands on the memory 208. Such primary data access operations/commands may include, without limitation, read, write, masked write, and RMW operations/commands conducted on selectively addressed storage locations defined in the memory 208. The primary data access operations may include control of additional functions for proper interface with the particular type of memory device(s) employed in the memory 208.

For some embodiments, the error control portion 222 includes one or more digital circuits that implement functional logic for detecting and correcting errors in data segments as stored in memory 208. The error control portion 222 can include execution of error checking data processing, such as ECC processing of predetermined code format (e.g., a format of SECDED type), to detect errors in a corrupted primary data segment read from the memory 208. The error control portion 222 is configured to correct the primary data segment read from the memory 208 having an error that is correctable with the given error checking data (e.g., ECC), and report (e.g., for the master control operation) those primary data segment errors which are detected but are not correctable with the given error checking data. The error control portion 222 can also provide intermediate storage of error checking data (e.g., ECC) bytes generated or read in association with primary data bytes during the execution of various primary data access operations, for cooperative transmission with their primary data bytes either to the PHY 206 (for writing operations) or error-checking of retrieved primary data for return to the user interface ports 202 (for reading operations).

The command control portion 220 may be coupled to both the error control and data control portions 222, 224. For some embodiments, the command control portion 220 includes one or more digital circuits that implement functional logic for generating commands to actuate various primary data access operations of the data control portion 224. The command control portion 220 may include one or more suitable units for carrying out memory access operations responsive to memory transactions of user applications involving error checking data-protected data words. For example, where inline storage of error checking data is implemented, the command control portion 220 may include address translation and command translation functions involved in adaptively splitting the memory addressing of error checking data (e.g., ECC data) and primary data, which facilitates inline storage of primary data with associated error checking data.

As shown, the command control portion 220 includes a RMW interleaving logic 230 that implements RMW interleaving operations described herein. In particular, during placement of RMW command sequences by the command control portion 220 in a command queue (not shown), the RMW interleaving logic 230 can cause the command control portion 220 to split the read and write components of a RMW command sequences, group the read components in the command queue to execute consecutively, and group the write components in the command queue to execute consecutively.

Figure 3:
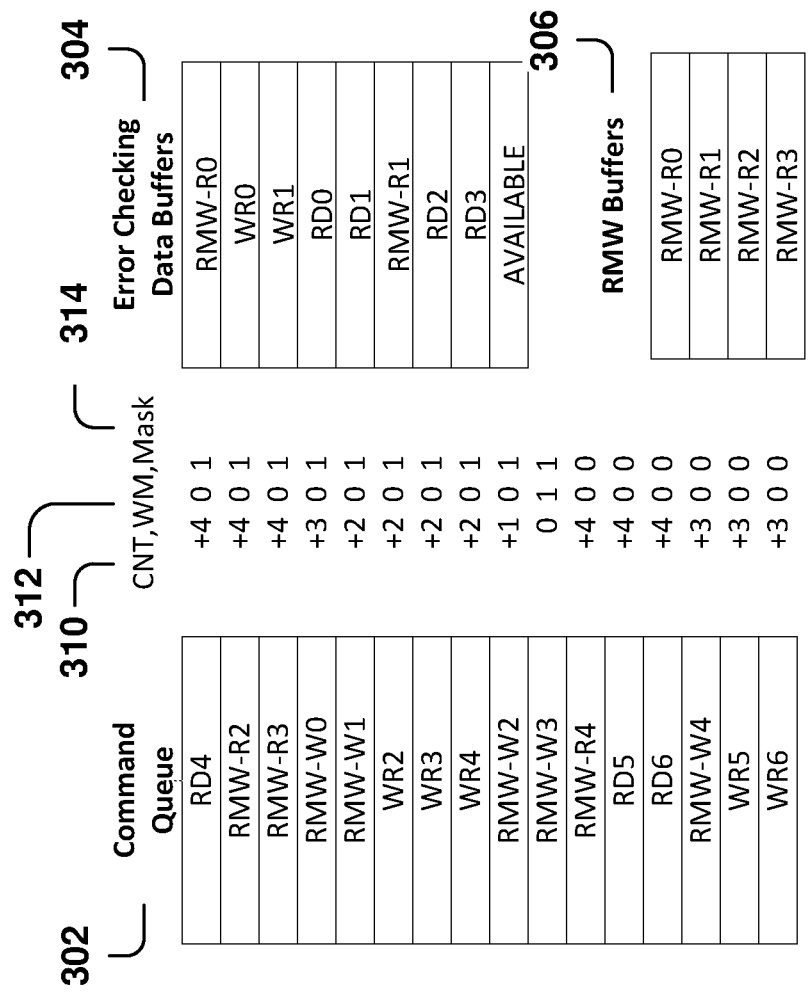
FIG. 3 is a diagram illustrating an example memory system that stores primary data inline with error checking data and interleaves RMW command sequences, in accordance with some embodiments.

FIG. 3 is a diagram illustrating an example command queue 302, example error checking data buffers 304, and example RMW buffers 306 of a memory system that stores primary data inline with error checking data and that interleaves RMW command sequences, in accordance with some embodiments. As shown, with respect to the command queue 302, the memory system maintains a count (CNT) 310 of RMW-write commands in a current RMW group in the command queue 302, a watermark (WM) bit 312 for each entry of the command queue 302, and a mask bit (MASK) 314 for each entry of the command queue 302. As also shown, the command queue 302 has a depth of 16 commands and the error checking data buffers 304 includes 8 buffers.

The contents of the command queue 302 and the error checking data buffers 304 reflect operation of the memory system, using RMW interleaving of an embodiment described herein, based on a maximum RMW limit of 4 and the following incoming command order: RD0 (read #0), RD1, WR0 (write #0), WR1, RMW0 (read-modify-write #0), RMW1, RD2, RD3, RD4, WR2, WR3, WR4, RMW2, RMW3, RMW4, RD5, RD6, WR5, and WR6. In summary, during operation of the memory system, commands RD0 and RD1 pass through the command queue 302, are selected for execution, and cause allocation of error checking data buffers from error checking data buffers 304. Commands WR0 and WR1 pass through the command queue 302, are selected for execution, and cause allocation of error checking data buffers from error checking data buffers 304.

Command sequences RMW0 and RMW1 are split and their read and write commands grouped in the command queue 302 (first RMW group of consecutive read commands and first RMW group of consecutive write commands); RMW buffers from the RMW buffers 306 are allocated for each of RMW-R0 and RMW-R1; and RMW-R0 and RMW-R1 are placed ahead of the first RMW group of consecutive write commands (i.e., RMW-W0 and RMW-W1) in the command queue 302. Eventually, commands RMW-R0 and RMW-R1 pass through the command queue 302 and are selected for execution, which causes allocation of error checking data buffers from error checking data buffers 304.

Commands RD2, RD3, and RD4 are placed in the command queue 302 behind RMW-R0 and RMW-R1. Eventually, commands RD2 and RD3 pass through the command queue 302, are selected for execution, and allocated error checking data buffers from error checking data buffers 304, thereby leaving RD4 currently at the top of the command queue 302.

Commands WR2, WR3, and WR4 are placed in the command queue 302 behind RMW-W1 due to read/write ordering rules to minimize bus turn-arounds.

Command sequences RMW2 and RMW3 are split and their read and write commands grouped in the command queue 302 (first RMW group of consecutive read commands and first RMW group of consecutive write commands), and the watermark bit associated with RMW-W3 is set based on the maximum number of interleaved RMW being reached (i.e., CNT=0 since the group of RMW-R2 and RMW-R3 reserve the last two error checking data RMW buffers). Commands RMW-R2 and RMW-R3 are placed in the command queue 302 behind R4 due to read/write ordering rules to minimize bus turn-arounds, and RMW-W2 and RMW-W3 are placed behind W4 for the same reason.

Command sequence RMW4 is split and its read and write commands grouped in the command queue 302 (second RMW group of consecutive read commands and second RMW group of consecutive write commands). Command RMW-R4 cannot be placed behind RMW-R3 because the RMW buffers 306 have been fully allocated. Accordingly, RMW-R4 is placed behind RMW-W3 since it cannot be placed in the first RMW group of consecutive reads, it is placed behind the group of writes.

Commands RD5 and RD6 are be placed in the command queue 302 as part of the second RMW group of consecutive read commands, and commands WR5 and WR6 are be placed in the command queue 302 as part of the second RMW group of consecutive write commands.

Figure 4:
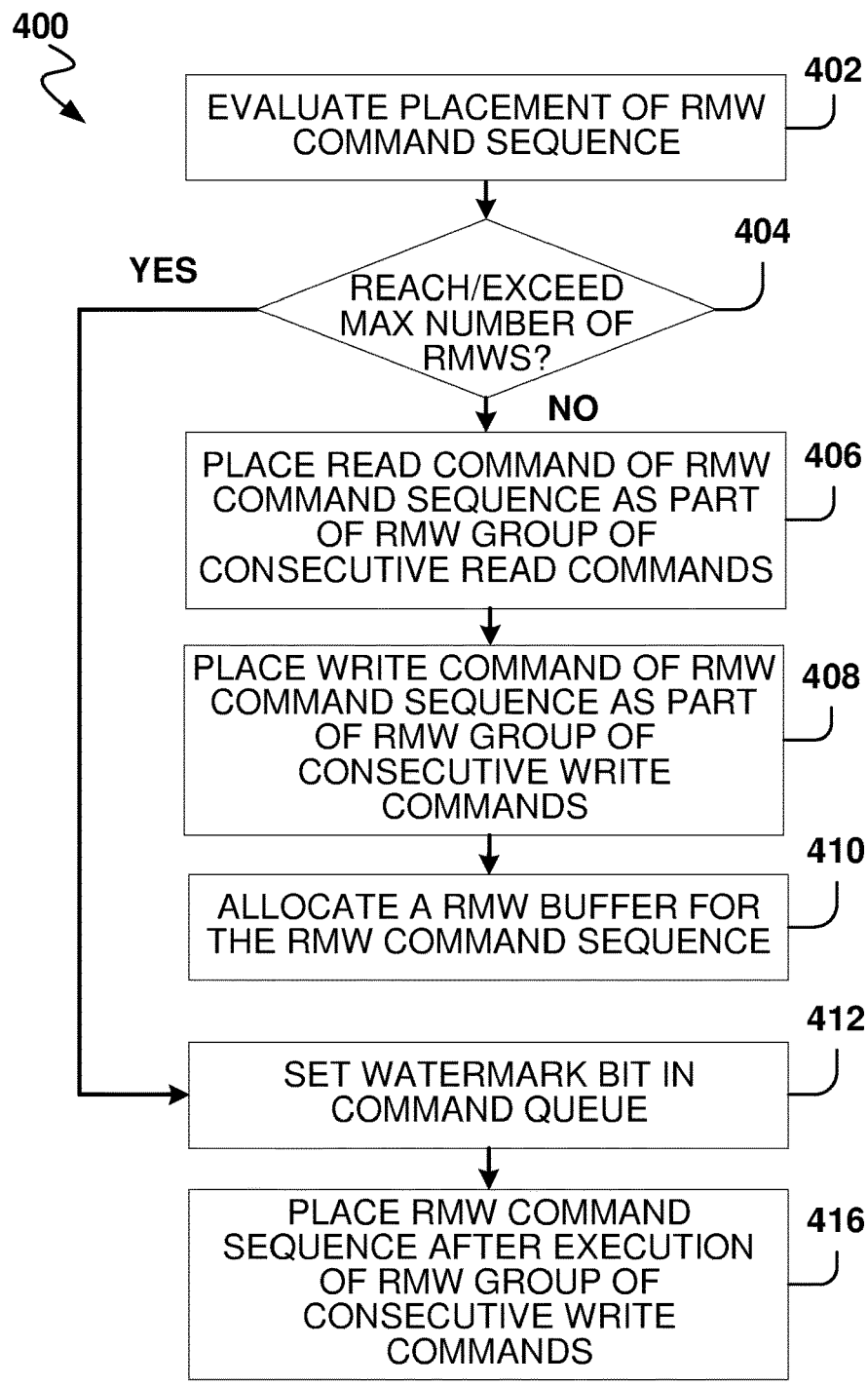
FIG. 4 is a flow diagram illustrating an example method for interleaving RMW command sequences, in accordance with various embodiments.

FIG. 4 is a flow diagram illustrating an example method 400 for interleaving RMW command sequences, in accordance with various embodiments. For some embodiments, the method 400 is performed by a memory controller of a memory system, such as the memory controller 106 described above with respect to FIG. 1. Though the steps of method 400 may be depicted and described in a certain order, the order in which the steps are performed may vary between embodiments. For example, a step may be performed before, after, or concurrently with another step. Additionally, the components described below with respect to the method 400 are merely examples of components that may be used with the method 400, and other components may also be used in some embodiments.

As shown in FIG. 4, the method 400 begins at operation 402, with the memory controller 106 evaluating placement of a RMW command sequence in a command queue maintained by the command queue component 110, where evaluating placement of the RMW command sequence comprises determining whether a predetermined maximum number of read-modify-writes has been reached or exceeded. In particular, for some embodiments, determining whether the predetermined maximum number of read-modify-writes has not been reached or exceeded (at operation 402) comprises determining whether the predetermined maximum number of read-modify-writes has not been reached or exceeded beyond any entry in the command queue that has a watermark bit set. The memory controller 106 may determine whether the predetermined maximum number of read-modify-writes has been reached or exceeded is based on a counter that tracks a number of write commands in the read-modify-write group of consecutive write commands. In particular, where a memory stores primary data inline with error checking data, the counter may track the number of primary data RMW-write commands in the read-modify-write group of consecutive write commands.

At decision operation 404, in response to determining that the predetermined maximum number of read-modify-writes has not been reached or exceeded (at operation 402), the method 400 continues to operation 406. As noted above with respect to operation 402, determining whether the predetermined maximum number of read-modify-writes has not been reached or exceeded may comprise determining whether the predetermined maximum number of read-modify-writes has not been reached or exceeded beyond any entry in the command queue that has a watermark bit set.

At operation 406, the method 400 continues with the memory controller 106 placing, in the command queue, a first read command of the RMW command sequence as part of a read-modify-write group of consecutive read commands in the command queue. According to various embodiments, at operation 406, the read-modify-write group of consecutive read commands in the command queue is placed behind all entries in the command queue that have a watermark bits set.

At operation 408, the method 400 continues with the memory controller 106 placing, in the command queue, a first write command of the RMW command sequence as part of a read-modify-write group of consecutive write commands. According to various embodiments, at operation 408, the read-modify-write group of consecutive write commands is placed in the command queue behind the read-modify-write group of consecutive read commands in the command queue.

For some embodiments, the memory controller 106 causes primary data to be stored inline with error checking data (generated for the primary data) on the memory component 102 using split addressing for memory transactions, where the primary data is stored on the memory at a range of inline primary data addresses and the error checking data is stored on the memory at a range of inline error checking data addresses. Based on a requested memory transaction, the memory controller 106 generates a first RMW command sequence for particular primary data and a second RMW command sequence for particular error checking data, where the particular error checking data is generated for the particular primary data. Accordingly, at operation 406, the memory controller 106 may place, in the command queue, a first read command of the first RMW command sequence and a second read command of the second RMW command sequence as part of a read-modify-write group of consecutive read commands in the command queue. Additionally, at operation 408, the memory controller 106 may place, in the command queue, a first write command of the first RMW command sequence and a second write command of the second RMW command sequence as part of a read-modify-write group of consecutive write commands.

At operation 410, the method 400 continues with the memory controller 106 allocating a read-modify-write buffer for the RMW command sequence.

At decision operation 404, in response to determining that the predetermined maximum number of read-modify-writes has been reached or exceeded (at operation 402), the method 400 continues to operation 412. At operation 412, the method 400 continues with the memory controller 106 setting a watermark bit in the command queue. The memory controller 106 may set the watermark bit with respect to an entry in the command queue associated with at least a last write command in the read-modify-write group of consecutive write commands. According to various embodiments, the command queue can comprise two or more watermark bits that are set and, accordingly, setting a watermark bit in the command queue at operation 412 may represent a new watermark bit being set in the command queue.

At operation 416, the method 400 continues with the memory controller 106 placing the RMW command sequence in the command queue such that the RMW command sequence executes after execution of the read-modify-write group of consecutive write commands In particular, the memory controller 106 may place the RMW command sequence in the command queue behind at least a last entry in the command queue having a watermark bit that is set. According to some embodiments, performing operation 416 comprises performing operations similar to one or more of operations 406 through 408.

Figure 5:
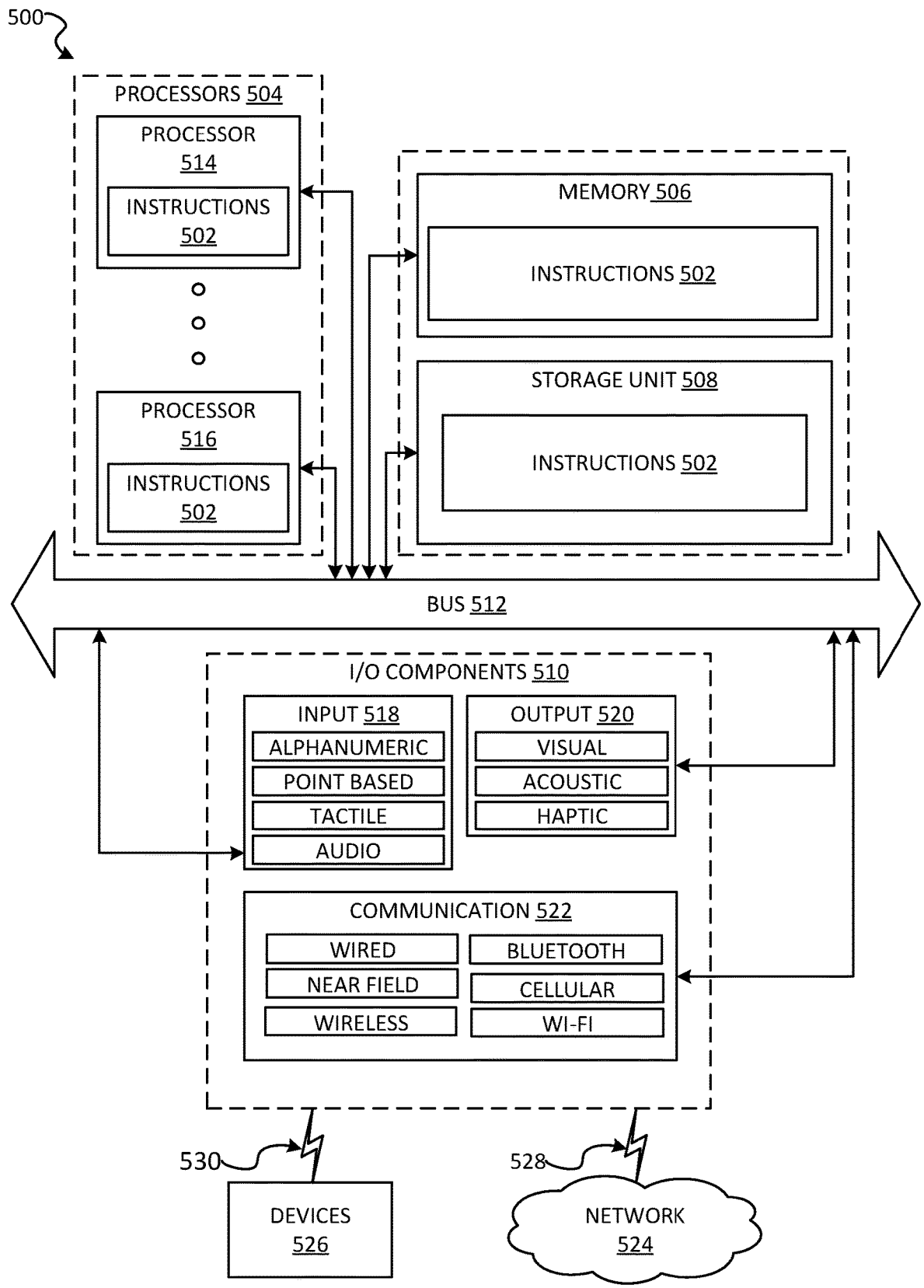
FIG. 5 is a block diagram illustrating components of a machine, according to some example embodiments, able to read instructions from a machine-readable medium (e.g., a machine-readable storage medium) and perform any one or more of the methodologies discussed herein.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a system, within which instructions 502 (e.g., software, a program, an application, an applet, an app, a driver, or other executable code) for causing the machine 500 to perform any one or more of the methodologies discussed herein may be executed. For example, the instructions 502 include executable code that causes the machine 500 to execute the method 400. In this way, these instructions 502 transform the general, non-programmed machine 500 into a particular machine programmed to carry out the described and illustrated method 400 in the manner described herein. The machine 500 may operate as a standalone device or may be coupled (e.g., networked) to other machines.

By way of non-limiting example, the machine 500 may comprise or correspond to a computer (e.g., a server computer, a client computer, a personal computer (PC), a tablet computer, a laptop computer, or a netbook), a mobile device, or any machine capable of executing the instructions 502, sequentially or otherwise, that specify actions to be taken by the machine 500. Further, while only a single machine 500 is illustrated, the term "machine" shall also be taken to include a collection of machines 500 that individually or jointly execute the instructions 502 to perform any one or more of the methodologies discussed herein.

The machine 500 may include processors 504, memory 506, a storage unit 508, and I/O components 510, which may be configured to communicate with each other such as via a bus 512. In an example embodiment, the processors 504 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 514 and a processor 516 that may execute the instructions 502. The term "processor" is intended to include multi-core processors 504 that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiple cores, or any combination thereof.

The memory 506 (e.g., a main memory or other memory storage) and the storage unit 508 are both accessible to the processors 504 such as via the bus 512. The memory 506 and the storage unit 508 store the instructions 502 embodying any one or more of the methodologies or functions described herein. The instructions 502 may also reside, completely or partially, within the memory 506, within the storage unit 508, within at least one of the processors 504 (e.g., within the processor's cache memory), or any suitable combination thereof, during execution thereof by the machine 500. Accordingly, the memory 506, the storage unit 508, and the memory of the processors 504 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 502. The term "machine-readable medium" shall also be taken to include any medium, or combination of multiple media, that is capable of storing instructions (e.g., instructions 502) for execution by a machine (e.g., machine 500), such that the instructions, when executed by one or more processors of the machine (e.g., processors 504), cause the machine to perform any one or more of the methodologies described herein (e.g., method 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 510 may include a wide variety of components to receive input, provide output, produce output, transmit information, exchange information, capture measurements, and so on. The specific I/O components 510 that are included in a particular machine 500 will depend on the type of the machine 500. For example, portable machines such as mobile phones will likely include a touch input device or other such input mechanisms, while a headless server machine will likely not include such a touch input device. It will be appreciated that the I/O components 510 may include many other components that are not specifically shown in FIG. 5. The I/O components 510 are grouped according to functionality merely for simplifying the following discussion and the grouping is in no way limiting. In various example embodiments, the I/O components 510 may include input components 518 and output components 520. The input components 518 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 510 may include communication components 522 operable to couple the machine 500 to a network 524 or devices 526 via a coupling 528 and a coupling 530 respectively. For example, the communication components 522 may include a network interface component or another suitable device to interface with the network 524. In further examples, the communication components 522 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 526 may be another machine or any of a wide variety of peripheral devices.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network 524 (e.g., the Internet) and via one or more appropriate interfaces (e.g., APIs).

Electronic Apparatus and System

Example embodiments may be implemented in digital electronic circuitry, in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 6:
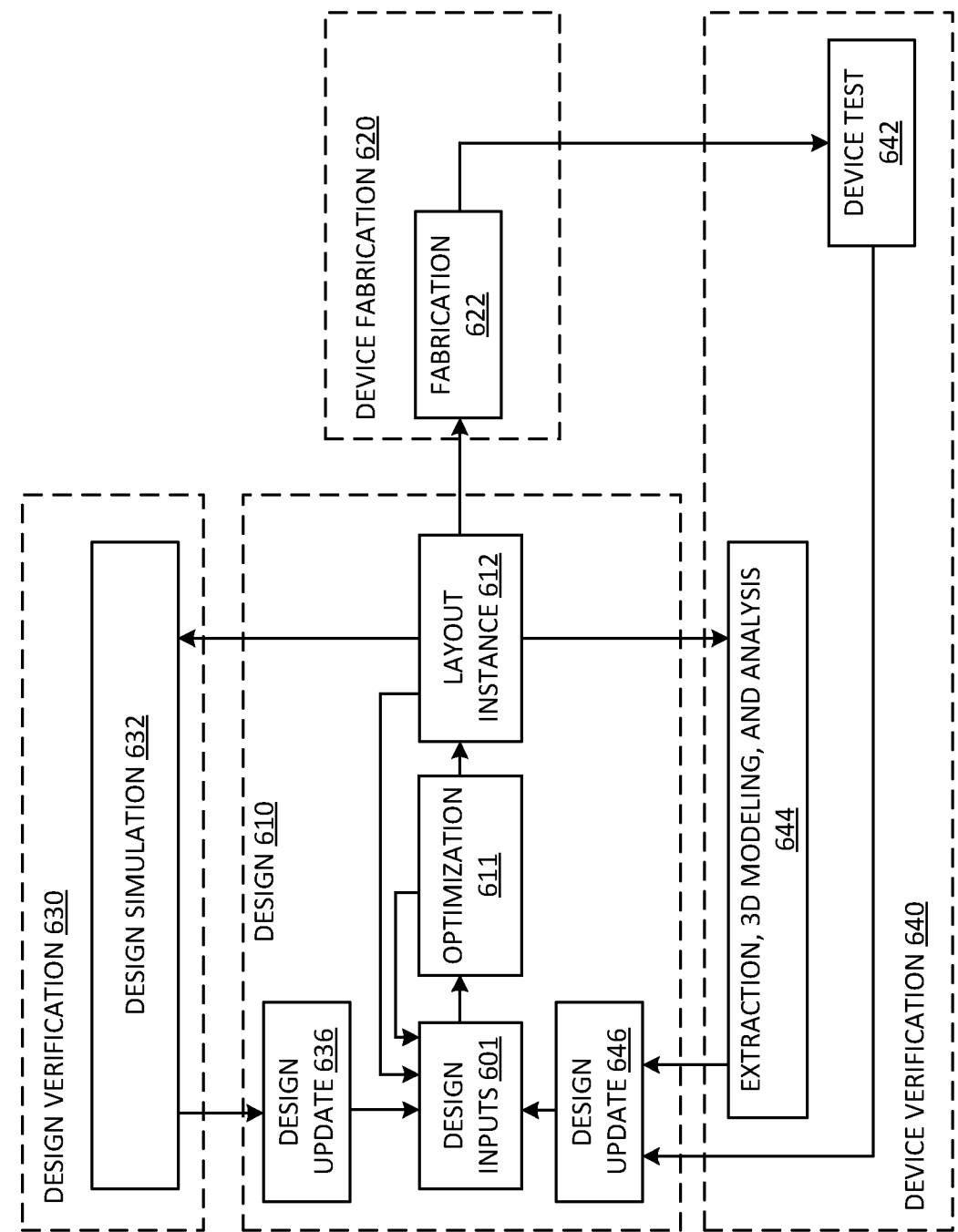
FIG. 6 is a diagram illustrating one possible design process flow for generating a circuit, including embodiments to implement a memory controller that supports interleaving of RMW command sequences as described herein, and in various embodiments, to integrate the memory controller with a larger integrated circuit comprising different design blocks.

FIG. 6 is a diagram illustrating one possible design process flow for generating a circuit, including embodiments to implement a memory controller that supports interleaving of RMW command sequences as described herein, and in various embodiments, to integrate the memory controller with a larger integrated circuit comprising different design blocks. As illustrated, the overall design flow 600 includes a design phase 610, a device fabrication phase 620, a design verification phase 630, and a device verification phase 640. The design phase 610 involves an initial design input operation 601 where the basic elements and functionality of a device are determined, as well as revisions based on various analyses and optimization of a circuit design. This design input operation 601 is where instances of an EDA circuit design file are used in the design and any additional circuitry is selected. The initial strategy, tactics, and context for the device to be created are also generated in the design input operation 601, depending on the particular design algorithm to be used.

In some embodiments, following an initial selection of design values in the design input operation 601, timing analysis and optimization according to various embodiments occurs in an optimization operation 611, along with any other automated design processes. One such process may be the automated design of a partitioned root search for error locator polynomial functions in RS FEC decoding. As described below, design constraints for blocks of a circuit design generated with design inputs in the design input operation 601 may be analyzed using hierarchical timing analysis, according to various embodiments. While the design flow 600 shows such optimization occurring prior to a layout instance 612, such hierarchical timing analysis and optimization may be performed at any time to verify operation of a circuit design. For example, in various embodiments, constraints for blocks in a circuit design may be generated prior to routing of connections in the circuit design, after routing, during register transfer level (RTL) operations, or as part of a final signoff optimization or verification prior to a device fabrication operation 622.

After design inputs are used in the design input operation 601 to generate a circuit layout, and any optimization operations 611 are performed, a layout is generated in the layout instance 612. The layout describes the physical layout dimensions of the device that match the design inputs. This layout may then be used in the device fabrication operation 622 to generate a device, or additional testing and design updates may be performed using designer inputs or automated updates based on design simulation 632 operations or extraction, 3D modeling and analysis 644 operations. Once the device is generated, the device can be tested as part of device test 642 operations, and layout modifications generated based on actual device performance.

As described in more detail below, design updates 636 from the design simulation 632, design updates 646 from the device test 642 or the 3D modeling and analysis 644 operations, or the design input operation 601 may occur after an initial layout instance 612 is generated. In various embodiments, whenever design inputs are used to update or change an aspect of a circuit design, a timing analysis and optimization operation 611 may be performed.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A memory controller comprising:
   a command queue component configured to provide a command queue storing a plurality of memory commands for timely execution by the memory controller; and
   a read-modify-write component configured to perform operations comprising:
   analyzing the command queue for read-modify-write command sequences;
   based on the analyzing the command queue:
      placing, in the command queue, read commands of a plurality of read-modify-write command sequences as a read-modify-write group of consecutive read commands; and
      placing; in the command queue, write commands of the plurality of read-modify-write command sequences as a read-modify-write group of consecutive write commands.

2. The memory controller of claim 1, wherein the read-modify-write group consecutive reads commands is placed in the command queue to execute prior to the read-modify-write group of consecutive write commands.

3. The memory controller of claim 1, wherein the read-modify-write component is further configured to perform operations comprising:
based on the analyzing the command queue:
allocating a read-modify-write buffer for each read command in the read-modify-write group of consecutive read commands.

4. The memory controller of claim 1, wherein the memory controller uses split addressing to generate memory commands for memory transactions with respect to a memory, the memory controller causes the memory to store primary data inline with error checking data generated for the primary data, and wherein the read-modify-write command sequences comprises at least one read-modify-write command sequence for particular primary data and at least one read-modify-write command sequence for particular error checking data that is associated with the particular primary data.

5. The memory controller of claim 4, wherein the read-modify-write component is further configured to perform operations comprising:
based on the analyzing the command queue:
allocating a read-modify-write buffer for each read command for primary data in the read-modify-write group of consecutive read commands; and
allocating an error checking data buffer for each read command for error checking data in the read-modify-write group of consecutive read commands.

6. The memory controller of claim 5, wherein the error checking data comprises error correcting code (ECC).

7. The memory controller of claim 1, wherein the read-modify-write component further configured to perform operations comprising:
based on the analyzing the command queue:
determining whether a predetermined maximum number of read-modify-writes has been reached or exceeded; and
in response to determining that the predetermined maximum number of read-modify-writes has been reached or exceeded, setting a watermark bit in the command queue.

8. The memory controller of claim 7, wherein the watermark bit is set with respect to an entry, in the command queue, associated with at least a last write command in the read-modify-write group of consecutive write commands.

9. The memory controller of claim 7, wherein the determining whether the predetermined maximum number of read-modify-writes has been reached or exceeded is based on a counter that tracks a number of write commands in the read-modify-write group of consecutive write commands.

10. The memory controller of claim 7, wherein the read-modify-write component is further configured to perform operations comprising:
in response to determining that the predetermined maximum number of read-modify-writes has been reached or exceeded, placing a subsequent read-modify-write command sequence in the command queue such that the subsequent read-modify-write command sequence executes after execution of the read-modify-write group of consecutive write commands.

11. The memory controller of claim 10, wherein the placing the subsequent read-modify-write command sequence in the command queue such that the subsequent read-modify-write command sequence executes after execution of the read-modify-write group of consecutive write commands comprises placing the subsequent read-modify-write command sequence in the command queue behind at least a last entry in the command queue having a set watermark bit.

12. A method comprising:
evaluating, by a memory controller, placement of a read-modify-write command sequence in a command queue, the evaluating comprising determining whether a predetermined maximum number of read-modify-writes has been reached; and
in response to determining that the predetermined maximum number of read-modify-writes has not been reached or exceeded:
placing, by the memory controller, a first read command of the read-modify-write command sequence in the command queue as part of a read-modify-write group of consecutive read commands in the command queue; and
placing, by the memory controller, a first write command of the read-modify-write command sequence in the command queue as part of a read-modify-write group of consecutive write commands.

13. The method of claim 12, further comprising:
in response to determining that the predetermined maximum number of read-modify-writes has not been reached or exceeded:
allocating, by the memory-controller, a read-modify-write buffer for the read-modify-write command sequence.

14. The method of claim 12; further comprising:
in response to determining that the predetermined maximum number of read-modify-writes has been reached or exceeded, setting, by the memory controller, a watermark bit in the command queue.

15. The method of claim 14, wherein the watermark bit is set with respect to an entry, in the command queue, associated with at least a last write command in the read-modify-write group of consecutive write commands.

16. The method of claim 12, further comprising:
in response to determining that the predetermined maximum number of read-modify-writes has been reached or exceeded, placing, by the memory controller, the read-modify-write command sequence in the command queue such that the read-modify-write command sequence executes after execution of the read-modify-write group of consecutive write commands.

17. The method of claim 16, wherein the placing the read-modify-write command sequence in the command queue such that the read-modify-write command sequence executes after execution of the read-modify-write group of consecutive write commands comprises placing the read-modify-write command sequence in the command queue behind at least a last entry in the command queue having a set watermark bit.

18. The method of claim 12, wherein the determining whether the predetermined maximum number of read-modify-writes has been reached or exceeded is based on a counter that tracks a number of write commands in the read-modify-write group of consecutive write commands.

19. A method comprising:
storing, on a memory, primary data inline with error checking data generated for the primary data using split addressing for memory transactions, the primary data being stored on the memory at a range of inline primary data addresses and the error checking data being stored on the memory at a range of inline error checking data addresses, the range of inline primary data addresses not overlapping with the range of inline error checking data addresses;

generating, by a memory controller and based on a requested memory transaction, a first read-modify-write command sequence for particular primary data and a second read-modify-write command sequence for particular error checking data, the particular error checking data being generated for the particular primary data;

evaluating, by the memory controller, placement of the first and second read-modify-write command sequences in a command queue, the evaluating placement comprising determining whether a predetermined maximum number of read-modify-writes has been reached;

in response to determining that the predetermined maximum number of read-modify-writes has not been reached or exceeded:

placing, by the memory controller, both a first read command of the first read-modify-write command sequence and a second read command of the second read-modify-write command sequence in the command queue as part of a read-modify-write group of consecutive read commands in the command queue; and placing, by the memory controller, both a first write command of the first read-modify-write command sequence and a second write command of the second read-modify-write command sequence in the command queue as part of a read-modify-write group of consecutive write commands.

20. The method of claim 19, further comprising:

in response to determining that the predetermined maximum number of read-modify-writes has been reached or exceeded, placing, by the memory controller, both the first read-modify-write command sequence and the second read-modify-write command sequence in the command queue such that both the first read-modify-write command sequence and the second read-modify-write command sequence execute after execution of the read-modify-write group of consecutive write commands.

* * * * *